(12) United States Patent
Teodorescu

(10) Patent No.: US 10,493,383 B2
(45) Date of Patent: Dec. 3, 2019

(54) OPTIMIZED RECYCLING OF DRILLING FLUIDS BY COORDINATING OPERATION OF SEPARATION UNITS

(71) Applicant: HALLIBURTON ENERGY SERVICES, INC., Houston, TX (US)

(72) Inventor: Sorin Gabriel Teodorescu, The Woodlands, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 129 days.

(21) Appl. No.: 15/558,141

(22) PCT Filed: Apr. 14, 2015

(86) PCT No.: PCT/US2015/025735
§ 371 (c)(1),
(2) Date: Sep. 13, 2017

(87) PCT Pub. No.: WO2016/167747
PCT Pub. Date: Oct. 20, 2016

(65) Prior Publication Data
US 2018/0043287 A1 Feb. 15, 2018

(51) Int. Cl.
*B01D 21/24* (2006.01)
*B01D 21/26* (2006.01)
(Continued)

(52) U.S. Cl.
CPC ......... *B01D 21/30* (2013.01); *B01D 21/2405* (2013.01); *B01D 21/262* (2013.01);
(Continued)

(58) Field of Classification Search
CPC .... B01D 21/30; B01D 21/267; B01D 21/262; B01D 21/283; B01D 21/2405;
(Continued)

(56) References Cited

U.S. PATENT DOCUMENTS 5,814,230 A * 9/1998 Willis .................... B01D 21/12
210/710
6,021,377 A * 2/2000 Dubinsky ............... E21B 7/068
702/9

(Continued)

OTHER PUBLICATIONS

International Search Report and Written Opinion; PCT Application No. PCT/US2015/025735; dated Nov. 23, 2015.

*Primary Examiner* — Joseph W Drodge
(74) *Attorney, Agent, or Firm* — Polsinelli PC

(57) ABSTRACT

One system embodiment includes: an inlet sensor that measures a fluid quality of an input fluid stream; an arrangement of separation units operating to extract contaminants from the fluid stream; and a user interface (UI). Each separation unit produces a respective output fluid stream, exhibiting a performance that is impacted by a respective operating parameter, and has an outlet sensor that measures an output fluid stream quality. The UI receives fluid quality measurements from the inlet and the outlet sensors, responsively derives a performance value for each separation unit and an overall performance value for the arrangement, and displays each of the performance values. The UI may further set the operating parameter values to automate and optimize the operation of the arrangement for different drilling conditions. The fluid quality measurements may indicate contaminant concentrations, and the performance values may account for separation efficiency, energy consumption, reliability, and next service date.

20 Claims, 2 Drawing Sheets

(51) Int. Cl.

| | |
|---|---|
| *B01D 21/30* | (2006.01) |
| *B01D 36/04* | (2006.01) |
| *E21B 21/06* | (2006.01) |
| *E21B 43/34* | (2006.01) |
| *E21B 43/40* | (2006.01) |
| *E21B 44/00* | (2006.01) |
| *B01D 21/28* | (2006.01) |

(52) U.S. Cl.
CPC ......... *B01D 21/267* (2013.01); *B01D 21/283* (2013.01); *B01D 21/302* (2013.01); *B01D 21/305* (2013.01); *B01D 36/04* (2013.01); *B01D 36/045* (2013.01); *E21B 21/062* (2013.01); *E21B 21/065* (2013.01); *E21B 43/34* (2013.01); *E21B 43/40* (2013.01); *E21B 44/00* (2013.01)

(58) Field of Classification Search
CPC ........ B01D 21/24; B01D 21/26; B01D 36/00; B01D 36/02; B01D 36/04; B01D 36/045; B01D 2221/04; B01D 21/34; B01D 2201/04; B01D 21/302; B01D 21/305; E21B 21/065; E21B 21/062; E21B 44/00; E21B 21/06; E21B 43/34; E21B 43/40; E21B 21/063; E21B 21/08; E21B 43/12; E21B 44/005; E21B 47/00; E21B 47/14; E21B 47/18; E21B 49/00; E21B 49/003; E21B 49/08; E21B 49/087; B04B 11/02; B04B 11/04; B04B 13/00; B04B 2013/006; B04C 5/26; B04C 11/00
USPC ......... 175/66, 206, 207, 217, 24, 40, 48, 50; 210/747.1, 785, 787, 806, 172.1, 170.01, 210/384, 385, 512.1, 259, 257.1, 739, 210/741, 744, 85, 87, 90, 96.1, 143
See application file for complete search history.

(56) References Cited

U.S. PATENT DOCUMENTS

| | | | |
|---|---|---|---|
| 8,316,963 B2 | 11/2012 | Eia et al. | |
| 8,337,577 B1 | 12/2012 | Moe et al. | |
| 8,845,894 B2 | 9/2014 | Isogami et al. | |
| 2002/0017491 A1* | 2/2002 | Haddock | B01D 61/022 210/652 |
| 2004/0016572 A1* | 1/2004 | Wylie | E21B 21/06 175/66 |
| 2007/0036699 A1 | 2/2007 | Oskoui | |
| 2007/0056726 A1 | 3/2007 | Shurtleff | |
| 2007/0119758 A1* | 5/2007 | Duplessis | C02F 1/008 210/85 |
| 2008/0210467 A1* | 9/2008 | Eia | E21B 21/066 175/24 |
| 2009/0082906 A1* | 3/2009 | Sanderson | B01D 1/16 700/271 |
| 2010/0038318 A1 | 2/2010 | Gilmour et al. | |
| 2011/0024189 A1* | 2/2011 | Saeed | E21B 21/08 175/40 |
| 2011/0036785 A1* | 2/2011 | Martin | E21B 21/065 210/770 |
| 2011/0214882 A1 | 9/2011 | Santos | |
| 2012/0013335 A1* | 1/2012 | Saasen | G01N 24/08 324/303 |
| 2012/0241217 A1* | 9/2012 | Davis | E21B 44/00 175/26 |
| 2012/0267287 A1* | 10/2012 | Bailey | B07B 1/4609 209/10 |
| 2014/0357464 A1* | 12/2014 | Stone | B04B 1/20 494/10 |
| 2015/0268374 A1* | 9/2015 | Rapoport | E21B 49/08 702/6 |
| 2016/0108687 A1* | 4/2016 | Rapoport | E21B 49/00 175/24 |
| 2016/0230482 A1* | 8/2016 | Rapoport | E21B 21/06 |
| 2017/0321504 A1* | 11/2017 | Ye | E21B 21/00 |
| 2018/0003654 A1* | 1/2018 | Chen | G01N 24/081 |

* cited by examiner

OPTIMIZED RECYCLING OF DRILLING FLUIDS BY COORDINATING OPERATION OF SEPARATION UNITS

CROSS-REFERENCE TO RELATED APPLICATIONS

This application is a national stage entry of PCT/US2015/025735 filed Apr. 14, 2015, said application is expressly incorporated herein in its entirety.

BACKGROUND

In the oilfield, work crews drill wells to access reservoirs of oil and gas. During the drilling process, the crews typically use the drill string to circulate drilling fluid through the borehole. The drilling fluid reduces frictional forces, flushes out the cuttings, and perhaps most importantly, counters the formation pressures that might otherwise produce undesired fluid inflows, blowouts, and hole collapses. Additives are frequently introduced to the drilling fluid to tailor its properties for these purposes, but regardless, the fluids that have entrained and mixed with formation fluids and drill cuttings must be handled with care to avoid polluting the environment.

One common approach, particularly advantageous at well sites having limited resources and/or limited disposal space, is to capture the exhausted drilling fluid for cleaning and re-use. To this end, the industry has developed a variety of technologies for separating drill cuttings and other contaminants from drilling fluid, including shakers, de-sanders, desilters, and centrifuges. Often, multiple such separation units are combined together with feed tanks, overflow containers, retention pits, augers, pumps, and valves to regulate the fluid flow rates between and among the units (as well as the feed rates of any additives to the flow stream). Conventionally, the various units are designed and individually optimized by their respective manufacturers using proprietary software and technology. The combination of units is selected and assembled for static operation in a wide variety of conditions, a strategy that necessarily limits the overall performance of the system. Moreover, the proprietary technology of the various units presents barriers to coordinated operation of the individually-acquired separation units.

BRIEF DESCRIPTION OF THE DRAWINGS

Accordingly, there are disclosed herein systems and methods for coordinating the operation of multiple separation units in a manner that optimizes one or more performance measures of the units and of the system as a whole. In the drawings.

Figure 1:
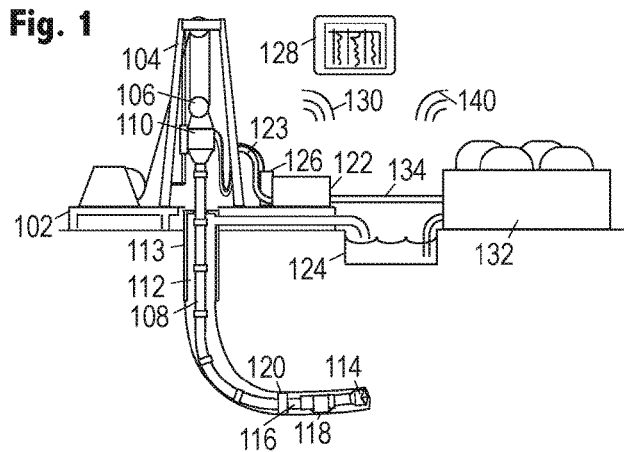
FIG. 1 is a diagram of an illustrative drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

To provide context and facilitate understanding of the present disclosure, FIG. 1 shows an illustrative drilling environment, in which a drilling platform 102 supports a derrick 104 having a traveling block 106 for raising and lowering a drill string 108. A top-drive motor 110 supports and turns the drill string 108 as it is lowered into the borehole 112. The drill string's rotation, alone or in combination with the operation of a downhole motor, drives the drill bit 114 to extend the borehole. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid (or "mud" in oilfield jargon) through a feed pipe 123 to the top drive 110, downhole through the interior of drill string 8, through orifices in the drill bit 114, back to the surface via the annulus around the drill string 108, and into a retention pit 124. The drilling fluid transports cuttings from the borehole 112 into the retention pit 124 and aids in maintaining the integrity of the borehole. An upper portion of the borehole 112 is stabilized with a casing string 113 and the lower portion being drilled is open (uncased) borehole.

The drill collars in the BHA 116 are typically thick-walled steel pipe sections that provide weight and rigidity for the drilling process. The thick walls are also convenient sites for installing logging instruments that measure downhole conditions, various drilling parameters, and characteristics of the formations penetrated by the borehole. Among the typically monitored drilling parameters are measurements of weight, torque, and vibration. The measured formation characteristics typically include resistivity, acoustic velocity, and natural gamma radiation. The BHA 116 typically further includes a navigation tool having instruments for measuring tool orientation (e.g., multi-component magnetometers and accelerometers). Other drilling, formation, and navigation parameter measurements are known and may also be provided by downhole instruments.

The BHA 116 also includes a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 102 to complete the telemetry link. The most popular telemetry link is based on modulating the flow of drilling fluid to create pe pulses that propagate along the drill string ("mud-pulse telemetry" or "MPT"), but other known telemetry techniques are suitable. Much of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A user interface module (shown in FIG. 1 as a tablet computer 128) communicates with the surface interface 126 via a wired or wireless link 130, collecting and processing measurement data to generate logs and other visual representations of the acquired data and the derived models to facilitate analysis by a user. The user interface module may be implements in any of many suitable forms, including: an embedded processor, a desktop computer, a laptop computer, a central processing facility, and a virtual computer in the cloud. In each case, software on a non-transitory information storage medium may configure the one or more processors implementing the user interface module to carry out the desired processing, modeling, and display generation.

Of particular note in FIG. 1 is the mud cleaning assembly 132 which draws contaminated drilling fluid from the retention pit 124 and processes it to produce recycled drilling fluid for re-use via return pipe 134. As illustrated in greater detail below, the mud cleaning assembly 132 includes multiple, individually controllable separation units that operate cooperatively on the contaminated drilling fluid stream. Each separation unit in the assembly includes one or more sensors of fluid characteristics that, in combination with an inlet sensor, enable monitoring of each separation unit's performance. A wired or wireless link 140 communicates the sensor measurements to the user interface module 128 and further communicates to the separation units settings of adjustable operating parameters.

In certain preferred embodiments, the user interface module executes a software application that displays performance values for each of the separation units, supports adaptation of the operating parameters for optimizing those performance values, and may further enable automation whereby the mud cleaning assembly is readily switched between different configurations either manually or automatically, e.g., in response to changes in drilling parameters. In this manner, the overall operation of the mud cleaning assembly may be automated and optimized, and may be provided with multiple setups for situational optimization of particle size distribution control, separation efficiency, energy consumption, equipment life, and reliability. Additional operating condition sensors or cameras may be included in the assembly to enable software-based scheduling of repair and maintenance of individual components. Moreover, this approach overcomes the traditional "silo" compartmentalization of individual separation unit behavior and management that has been enforced by the use of proprietary design and control technologies. In addition, this approach is applicable to existing systems as an "add-on" capability that is expected to enable greatly improved separation efficiencies, reduced power consumption, enhanced equipment reliability, and better-managed programs of maintenance and repair.

Figure 2:
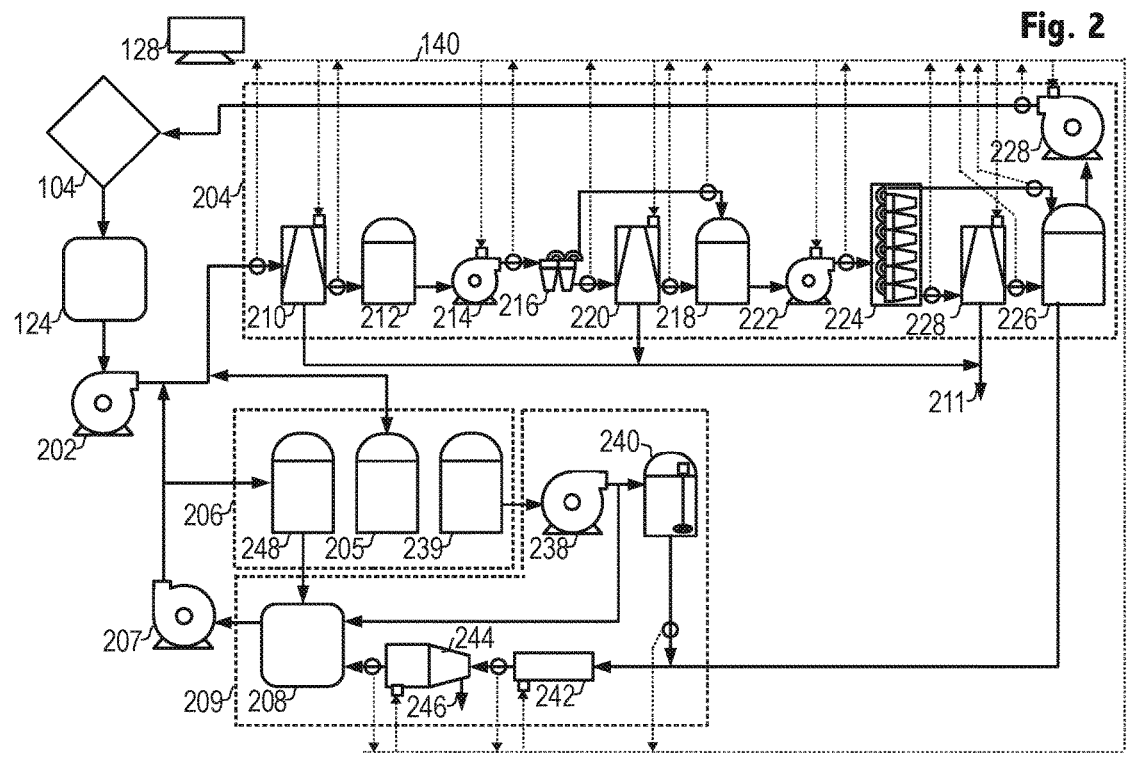
FIG. 2 is a schematic layout of an illustrative drilling fluid recycling system.

FIG. 2 shows an illustrative drilling fluid recycling system having three subsystems herein termed the primary recycling system 204, the contingency storage area 206, and the dewatering system 209. A centrifugal pump 202 draws contaminated drilling fluid from retention pit 124 and supplies it as an input fluid stream to the primary recycling system 204, relying if needed on mud storage tank(s) 205 in the contingency storage area 206 to govern the flow rate without permitting overflow of the retention pit 124. If needed to augment the flow rate, reclaimed water may be supplied by a second centrifugal pump 207 that draws from a reclaimed water holding pit 208 of the dewatering system 209.

A first shaker 210 accepts the input fluid stream, passing it through a series of vibrating mesh screens that permit fluids and particulates smaller than the mesh opening size to pass through to an "underflow" outlet while retaining and conveying larger particulates to an "overflow" outlet for solids discharge 211. The vibration, originally introduced to prevent clogging of the mesh openings, also facilitates in "drying" and conveying the screened material to the solids disposal outlet. The shaker 210 typically includes a series of replaceable screens having increasingly fine mesh openings. The screens can be replaced with others having different mesh sizes as dictated by the operational needs of the system.

The shaker 210 relies on one or more operating parameters to adjust its operation quickly, e.g., in response to changing flow rates, changing fluid viscosity, or changing particle size distributions. Depending on the shaker design, these operating parameters are one or more of: vibration frequency, vibration amplitude, and screen inclination. These operating parameters also affect the shaker's performance in terms of separation efficiency, power consumption, reliability, and maintenance/repair schedule.

Separation efficiency can be measured in a number of suitable ways. One suitable approach defines separation efficiency $E_s$ as:

$$E_s = \frac{C_{in} - C_{out}}{C_{in}} * 100\%$$

where $C_{in}$ is the concentration of solids in the input fluid stream and $C_{out}$ is the concentration of solids in the output fluid stream. These concentrations can be measured directly, but more often would be derived from correlations with one or more other fluid properties such as density, mass flow rate, viscosity, drag, flow noise, particle size distribution, pH, and speed of sound. Some properties or combinations thereof may be used as substitutes for concentration measurements in the formula.

Power consumption may be measured from the electrical voltage and current supplied to the shaker motors, or may be estimated based on correlations with operating parameters and one or more measured fluid properties of the fluid streams entering and exiting the shaker.

Reliability represents the risk of equipment failure necessitating shutdown of the shaker 210 or otherwise rendering it ineffective. Reliability may be calculated from a reliability model that takes into account the shaker design and the history of similar shaker designs, and operates on inputs representing the time since the last maintenance or repair event and the fatigue of the various shaker components from accrued operation time with past operating parameter settings and operating conditions. The reliability model forecasts the risk of equipment failure in a specified time window (e.g., time to next scheduled service date) given the current operating parameter settings.

Another performance measure is estimated time to failure (ETF). A convenient technique for determining an estimated time to failure is to calculate the time with the current operating parameter settings that would be required for the risk of equipment failure to exceed a predetermined threshold, e.g., 5%. This ETF value is then used to adjust the next scheduled service date for maintenance and repair, or at least to notify a user if the ETF value is less than the time to the next scheduled service date. Insofar as feasible, the ETF values are determined on a component-by-component basis, enabling service to scheduled accurately whether motivated by, e.g., screen wear or bearing vibration.

Returning to FIG. 2, shaker 210 produces, via the underflow outlet, an output fluid stream that is directed into tank 212. Tank 212 provides intermediate storage and may serve as a mixing tank for the introduction of flocculants or other additives for treating the fluid.

A centrifugal pump 214 drives a fluid stream from tank 212 through a series of desander hydrocyclones 216 that separate the fluid stream into a "lights" output stream and a "heavies" output stream. The "lights" output stream has a significantly reduced solids concentration relative to the input stream, whereas the "heavies" output stream has a significantly increased solids concentration. Most hydrocyclone units are currently designed without moving parts, limiting their operating parameter to the input flow rate, yet future designs may permit adjustment of their geometry to provide additional operating parameters for dynamically tailoring performance.

For hydrocyclone separators, the separation efficiency may be calculated using the concentration in the "lights" output stream, though of course this can be derived from measurements of the concentration in the "heavies" output stream. The power consumption is that of the pump driving the fluid through the hydrocyclone. Reliability and maintenance are similarly determined by the limitations of the drive pump.

The "lights" output stream from hydrocyclones 216 is directed into a second tank 218. The "heavies" output stream is directed to a second shaker 220 having a finer mesh for separating residual fluid from the solids. As with the first shaker 210, the overflow stream is directed to a solids discharge outlet 211. The underflow stream is directed to the second tank 218.

Another centrifugal pump 222 drives a fluid stream from tank 218 through a series of desilter hydrocyclones 224 that separate even finer solids from the fluid stream. The "lights" output stream is directed to a "clean" mud tank 226, while the "heavies" output stream is directed to a third shaker 228. As with the second shaker, an even finer vibrating mesh is employed to separate residual fluid from the solids, which overflow to the solids discharge 211. The underflow outlet directs the residual fluid to the "clean" mud tank 226. The contents of the clean mud tank 226 are available for re-use by the drilling rig. A centrifugal pump 228 supplies the recycled mud from tank 226 to the drilling rig platform 104 for injection into the borehole. Thus the primary recycling system 204 includes separation units 210, 216, 220, 224, and 228, with a number of intermediate tanks and pumps, operating cooperatively on the drilling fluid stream to remove drill cuttings and other solids to make the drilling fluid suitable for re-use.

The user interface module 128 is coupled via a wired or wireless communications link 140 to a series of fluid quality sensors (shown as circles) at various stages of the recycling process to measure one or more characteristics of the fluid stream at that point, and to equipment controllers (shown as small squares) to set operating parameter values. Significantly, each separation unit 210, 216, 220, 224, 228, is provided with an outlet sensor for at least one output fluid stream, and the assemblage is provided with an inlet sensor for the input fluid stream.

In at least some embodiments, the fluid quality sensors measure density of the fluid in the flow stream. The fluid quality sensors may further measure volume or mass flow rates. Contemplated variations of the system employ fluid quality sensors that additionally acquire one or more of the following measurements: multiphase flow rates, particle size distribution, viscosity, gel strength, emulsion stability, pH, temperature, and pressure. Moreover, some system embodiments further include other sensors for monitoring the operation of the system components, such as cameras, microphones, chemical sensors, fuses, leak detectors, or indeed any sensor suitable for detecting suboptimal operation of, or incipient failure of, the separation units.

The equipment controllers set the operating parameter values for their respective separation units. The equipment controllers for the shakers control vibration frequency, vibration amplitude, and/or inclination angle of the screens. The equipment controllers for the hydrocyclone separators (i.e., the controllers for the drive pumps) control the input stream flow rates, either directly or indirectly based on motor RPM or drive current. The equipment controller for the centrifuges (described further below) control the torque or rotation rate of the centrifuge drums and the input stream flow rates.

FIG. 2 further illustrates a dewatering system 209 for reclaiming water from drilling fluid or otherwise serving as a source of usable water to water holding pit 208. A centrifugal pump 238 draws water from a fresh water tank 239 (in contingency storage area 206) or from a local water source to prime the system and to compensate for fluid loss to the formation. The flow from pump 238 can be directed directly to pit 208 and thence via pump 207 to a reclaimed water storage tank 248 in contingency storage area 206 or as part of the input fluid stream to primary recycling system 204.

The flow from pump 238 can also be directed to wherever fresh water is desired, such as a polymer mixing tank 240. Tank 240 contains a polymer additive that gets injected into a flow stream drawn from clean mud tank 226. The polymer additive is provided to facilitate flocculation and settling of colloidal materials in the flow stream. A progressive cavity pump 242 feeds the flow stream to a continuous-flow centrifuge separator 244. The centrifuge 244 splits the fluid flow into a "heavies" flow stream 246 that is directed to a solids discharge outlet, and into a "lights" flow stream that is directed to the water holding pit 208.

The separation efficiency of the centrifuge separator may be calculated based on solids concentrations of the input and "lights" output flow streams. The power consumption is that of the centrifuge motors for spinning the barrel and any internal vanes. The motors and bearings are primary components of the reliability and maintenance calculations.

As with the primary recycling system, the user interface module is coupled to a fluid quality sensor on at least one of the separation unit outlets and between that unit and any preceding separation units. It is also coupled via the wired or wireless link to equipment controllers that set the operating parameters of the separation units. Where tanks or other components may cause significant delays between a fluid's exit of one separation unit and its entry into another, an additional fluid quality sensor may be provided at the inlet to the downstream separation unit. Relatedly, additional sensors may be provided at manifolds or other branches that permit the fluid flow to be divided into multiple streams.

Figure 3:
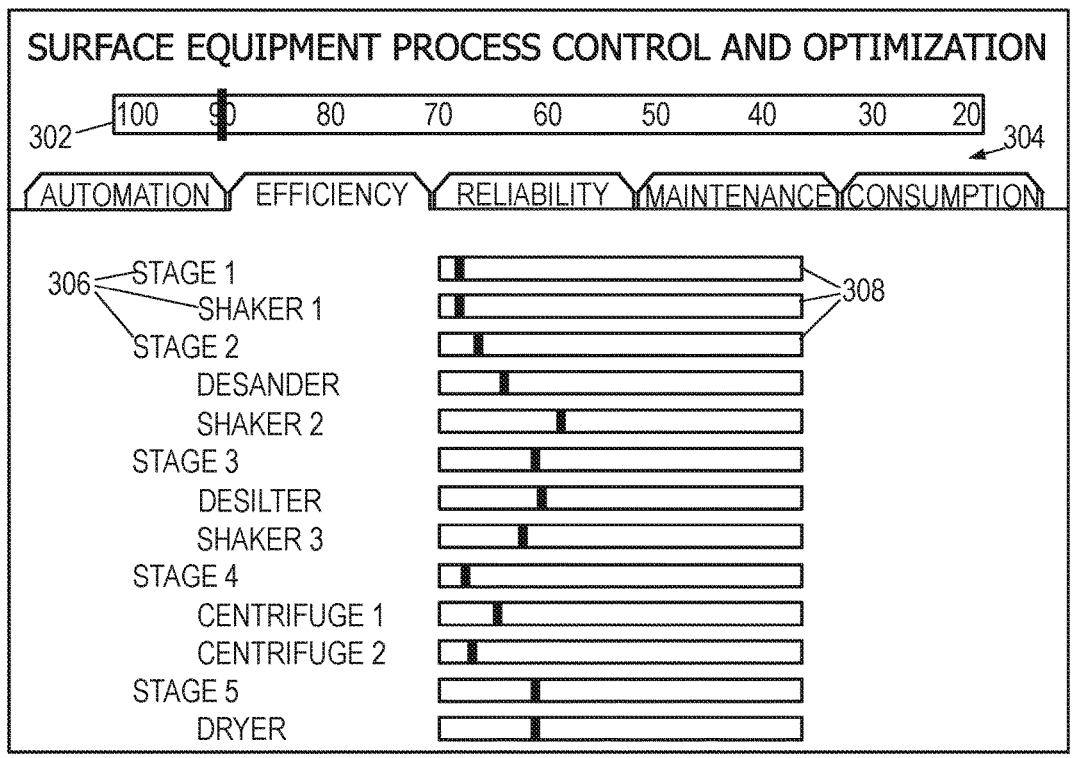
FIG. 3 is a view of an illustrative user interface window.

FIG. 3 provides an illustrative screen shot of a graphical user interface displayed by software on the user interface module 128. The user interface module 128 is coupled to the fluid quality sensors and the equipment controllers to monitor and control the various components in an arrangement of separation units including, but not limited to, shakers, desanders, desilters, centrifuges, augers, pumps, and valves. The user interface module 128 may take the form of a smart phone or tablet, though laptops, desktops, and other computers can also be employed. The software may take the form of a user application that is installed on the user interface module and executed to automate and optimize the operation of the separation unit arrangement.

As described above, sensors are attached to the system components to sense fluid properties and the components are instrumented to enable the user interface module to read and write equipment controller settings to adjust the operating parameters as needed. The user interface module may connect to the instrumented components via a Bluetooth connection or standard communication protocols of another type. One contemplated embodiment employs a smart phone, tablet, or other form of handheld computer having a wireless network interface to implement the user interface module.

The application provides a graphical user interface for user monitoring and control of the operation, including automation and optimization. The illustrative screen shot shows a bar 302 representing the overall performance of the system. The bar 302 may be shown in the form of a scale or spectrum ranging from one performance extreme to the other, and may further include an indicator representing the current system performance. In FIG. 3, the scale ranges from 100% separation efficiency to 20% separation efficiency, and the indicator is shown hovering at 90%. The software may alternatively display overall performance in terms of power consumption, reliability, or time unit the next recommended service.

Below the overall performance bar 302, the illustrative screen shot shows a series of tabs 304 representing different aspects of the system operation. The illustrated tabs are: Automation, Efficiency, Reliability, Maintenance, and Power Consumption. The display is expected to change based on user's tab selection to show the relevant detail. The illustrated screen shot has the Efficiency tab selected, revealing a hierarchical list of separation units 306 and a corresponding list of visual scale bars 308 having indicators representing the efficiency of each individual unit. Thus, if the overall system efficiency falls below a desired threshold, the user may select this tab to identify the individual units responsible for the performance loss.

By way of example only, the viewer may note that the screen shot reveals five stages, with the fifth stage having the lowest performance. However, this stage is not part of the primary recycling system and does not adversely impact the overall performance. Rather, the low efficiency of stage 3 might call for closer attention by the user. As stage 3 includes a combination of two separation units, the display in turn shows individual performances of the two units. The performance of the desilter appears to be the limiting factor on system performance, suggesting that this is where attention should be focused if it is desired to improve system efficiency, e.g., by varying the operating parameters of the desilter. Conversely, if system efficiency is regarded as adequate, this display reveals that there are opportunities to optimize system performance in other ways, e.g., by trading the separation efficiency of stage 1 for a reduction in power consumption and an increase in reliability.

These priorities can be programmed into the software to enable the software to make such adjustments on its own. Alternatively, the software may be equipped with an expert learning system that monitors user changes to operating parameters and automatically extracts behavior patterns for later user.

In a similar fashion, the reliability tab may reveal failure risks of the overall system and each of the individual components. The maintenance/repair tab may reveal recommended times before next service for the overall system and each of the individual system components. The power consumption tab may reveal power consumption for the overall system and each of the individual components.

The automation tab can be implemented in a variety of ways. In one contemplated embodiment, it reveals pre-programmed operations profiles that can be manually or automatically selected based on operating conditions as detected by downhole or surface sensors. For example, there may be a profile for "Fast Drilling", a profile for "Hard Rock Formation", a profile for "Oily Sands", a profile for "Just Circulating", and so on, each profile providing an initial setting of the operating parameters for each equipment controller in the assemblage of separation units regarded as most suitable for that operating condition. Some system embodiments will enable adaptation after setting of the initial operating parameter values.

In another contemplated embodiment, the automation tab enables the specification of actions to be taken in response to detected events. Such actions may be taken in response to, e.g., failures, performance values crossing thresholds, and user inputs, and the actions may include, e.g., equipment shutdowns, re-routing of flow streams, flow rate adjustments, and so on.

Figure 4:
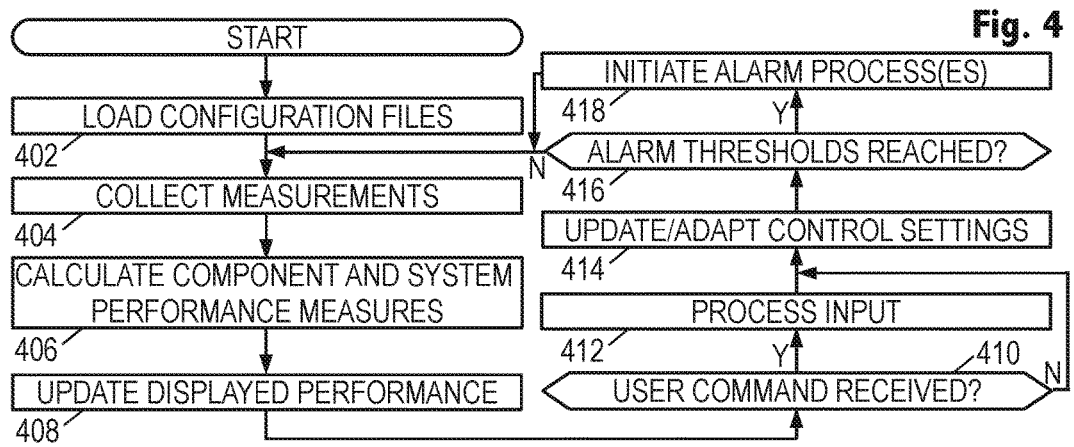
FIG. 4 is a flowchart of an illustrative method for coordinating the operation of multiple separation units.

FIG. 4 is a flowchart of an illustrative method that may be implemented by the user interface module's one or more processors in accordance with software instructions stored in memory and preprogrammed decisions based on acquired data and user input. In block 402, the processor loads configuration files from nonvolatile storage. The configuration files include previously programmed or derived information regarding the information available about the number, type, and layout of components in the system, including the arrangement of separation units, the location of fluid quality sensors, the adjustable operating parameters, the dependence of component performance values on the operating parameters, and the wired or wireless connection information for the sensors and equipment controllers. The processor further establishes the connections and determines the current operation parameter settings.

In block 404 the processor collects measurements from the fluid quality sensors at the system inlet and at the separation unit outlets. Based on these measurements and optionally on measurements from other sensors, the processor calculates one or more performance values for each separation unit and for the system as a whole in block 406. In block 408, the processor provides the updated performance values on the display in real-time.

In block 410, the processor determines whether user input has been received, and if so, the processor processes the input in block 412. Such user input includes actions to change the information viewed on the display, e.g., by selecting different tabs in FIG. 3. It may further include selections of different pre-programmed operations profiles, the setting of alarm limits, and manual alteration of operating parameter values. Information regarding recent or anticipated maintenance and repair actions may similarly be included.

Once the processing of user input is complete, or if no user input was received, the processor in block 414 updates the operating parameter settings and communicates any changes to the equipment controllers. In at least some embodiments, the updating includes feedback-based adaptation to optimize the operation of the separation units, whether in terms of separation efficiency, power consumption, reliability, and minimization of downtime for maintenance and repair. The optimization preferably employs a prioritized combination of these factors to maximize performance at the individual unit and overall system levels.

In block 416, the processor determines whether any alarm thresholds have been reached, whether because the current settings of the operating parameters or the current performance values are outside of a previously determined range of acceptable values. If so, the processor initiates the alarm process in block 418. The alarm process includes providing the user with notification of the alarm condition. Such notification may include any of the following: showing a warning message on the display, sounding a buzzer, sending a text or email to a preprogrammed address, and adjusting deadlines for planned maintenance and repair activities. Depending on the alarm, the alarm process may further include automatic adjustment of operating parameter values back into an acceptable range, adjustment of other operating parameter values to compensate, automatic selection of a "safe" operating profile, activation of "backup" systems, and automatic equipment shutdown.

If no alarms occurred, or once they have been processed, the processor returns to block 404 to collect further measurements. Blocks 404-418 are repeated to monitor and automate the operation of the system. The illustrative method addresses the singular unpredictability of the drilling process to maintain system performance in the face of widely varying drill cutting materials, sizes, shapes, and rates, that would otherwise cause massive uncertainty in the performance of the assemblage of surface processing equipment. Moreover, the disclosed method is expected to reduce the amount of user training and attention required for operating the system at the same time it increases system longevity and reliability.

Numerous other modifications, equivalents, and alternatives, will become apparent to those skilled in the art once the above disclosure is fully appreciated. For example, particular types of separation units and support equipment (e.g., centrifugal and progressive cavity pumps) have been disclosed above, but the disclosure is also applicable to other separation unit arrangements for recycling drilling fluid. It is intended that the following claims be interpreted to embrace all such modifications, equivalents, and alternatives where applicable.

What is claimed is:

1. A system for optimizing drilling fluid recycling and separating operations, the system comprising:
   an inlet sensor that measures a fluid quality of an input fluid stream;
   an arrangement of separation units operating cooperatively to extract one or more contaminants from the input fluid stream, each separation unit producing a respective output fluid stream and having a related performance that is affected by a respective operating parameter, wherein each separation unit has an associated outlet sensor that measures a fluid quality of that unit's output fluid stream; and
   a user interface module in communication with the inlet sensor and the outlet sensors to receive fluid quality measurements from the inlet sensor and the outlet sensors, the user interface module in communication with a surface interface to receive measurement data, the surface interface obtaining measurement data from a bottom hole assembly and control mechanisms to control a drilling process utilizing the bottom hole assembly,
   wherein the user interface module responsively derives an overall performance value for the arrangement of separation units,
   wherein the user interface module adjusts one or more of the operating parameters to improve the overall performance value.

2. The system of claim 1, wherein the user interface module displays the overall performance value.

3. The system of claim 1, wherein the user interface module controls said operating parameters to automate adjustments of the arrangement based on preprogrammed profiles for different drilling conditions.

4. The system of claim 1, wherein the separation units are coupled in series.

5. The system of claim 4, wherein the user interface module adjusts values of the operating parameter of each of the separation units to improve the overall performance value.

6. The system of claim 1, wherein a performance value of each of the separation units is based on separation efficiency.

7. The system of claim 6, wherein the performance value is further based on at least one of: energy consumption, reliability, and time before next scheduled maintenance and/or repair.

8. The system of claim 1, wherein the user interface module comprises a user application executing on a handheld computer wirelessly connected to the inlet sensor, to the outlet sensors, and to each separation unit, wherein the user interface module sets the operating parameters based on the fluid quality measurements received from the inlet sensor and the outlet sensors.

9. The system of claim 1, wherein at least one of the separation units in the arrangement is a shaker having at least one operating parameter from a set consisting of vibration frequency, vibration amplitude, and screen inclination.

10. The system of claim 1, wherein at least one of the separation units in the arrangement is a hydrocyclone having input flow rate as an operating parameter.

11. The system of claim 1, wherein at least one of the separation units in the arrangement is a centrifuge having at least one operating parameter from a set consisting of rotation rate, torque, and power.

12. The system of claim 1, wherein the arrangement further includes one or more pumps or feed augers each having an output flow rate controlled by the user interface module.

13. The system of claim 1, wherein said fluid quality is indicative of contaminant concentration.

14. The system of claim 13, wherein said fluid quality comprises at least one of density, mass flow rate, multi-phase flow component rates, viscosity, drag, flow, noise, particle size distribution, pH, and speed of sound.

15. The system of claim 13, wherein said fluid quality further comprises a measure of at least one of: gel strength, emulsion stability, temperature, and pressure.

16. A method of operating an arrangement of separation units that cooperate to extract contaminants from an input fluid stream, each separation unit producing a respective output fluid stream and having a performance that is impacted by a respective operating parameter, the method comprising:
   measuring an input fluid quality of the input fluid stream with an inlet sensor;
   measuring an output fluid quality of each separation unit's output fluid stream with a respective outlet sensor;
   receiving, by a user interface, the input fluid quality from the inlet sensor and the output fluid quality from the outlet sensors;
   receiving, by the user interface, measurement data from a surface interface, the surface interface obtaining the measurement data from a bottom hole assembly and control mechanisms to control a drilling process utilizing the bottom hole assembly,
   deriving, by the user interface, an overall performance value for the arrangement; and
   adjusting, by the user interface, one or more of the operating parameters to improve the overall performance value.

17. The method of claim 16, further comprising setting the operating parameters based on a selected one of multiple preprogrammed profiles for different drilling conditions.

18. The method of claim 16, further comprising determining a relationship between the performance values of each of the separation units and the operating parameters; and adjusting values of the operating parameters to improve the performance value for at least one separation unit.

19. The method of claim 18, wherein the performance value accounts for separation efficiency and further accounts for at least one of: energy consumption, reliability, and time before next scheduled maintenance and/or repair.

20. The method of claim 16, wherein said fluid quality comprises at least one of density, mass flow rate, multi-phase flow component rates, viscosity, drag, flow, noise, particle size distribution, pH, and speed of sound.

\* \* \* \* \*